S. KRAUSER.
Clover Harvester.
No. 6,954.
Patented Dec. 18, 1849.
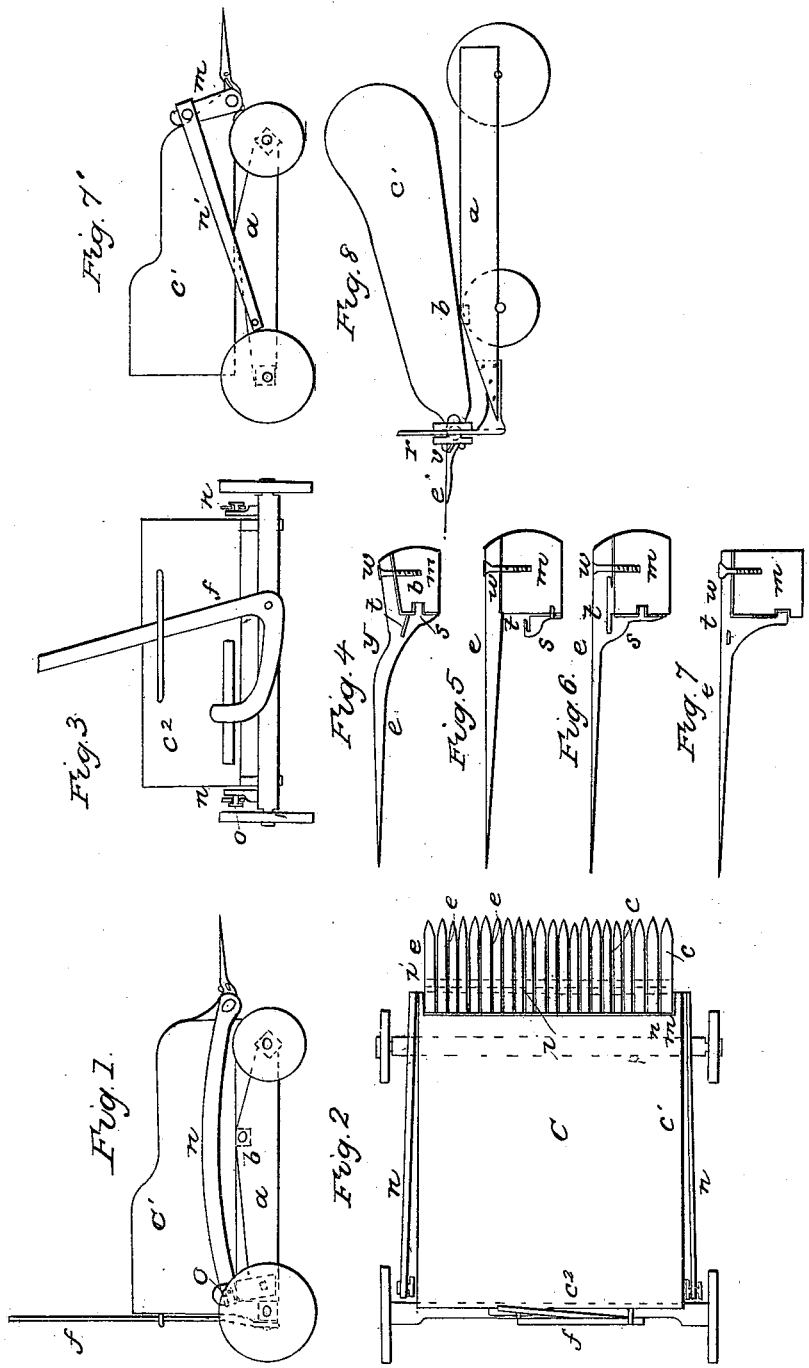

UNITED STATES PATENT OFFICE.

SAMUEL KRAUSER, OF READING, PENNSYLVANIA.

CLOVER-HARVESTER.

Specification of Letters Patent No. 6,954, dated December 18, 1849.

*To all whom it may concern:*

Be it known that I, SAMUEL KRAUSER, of Reading, in the county of Berks and State of Pennsylvania, have invented a new and Improved Machine for Gathering Clover-Seed, of which the following is a full, clear, and exact description, reference being had to the annexed drawings of the same, making part of this specification, in which—

Figure 1 is a side elevation. Fig. 2 is a top view. Fig. 3 is an elevation of the hinder end. Figs. 4, 5, 6, and 7 are side views of different modifications of the figures attached to fragments of the stock. Figs. 7 and 8 are side elevations of the machine showing different modes of maintaining the parallelism of the fingers with the ground while their height therefrom is varied.

My invention and improvement consists in giving to the teeth an improved form, and making the stock to which they are attached adjustable so as to carry them at different heights from the ground to adapt them to stripping the seed off clover plants of different heights, combining with the teeth a transverse knife attached to or passing through their rear ends, and so arranging the teeth that at whatever height they may be placed above the ground the angle they make therewith will be very nearly the same.

In the accompanying drawings *a* represents a rectangular frame supported on wheels, but either or both of its ends may be supported on sled runners. Across this frame an oscillating shaft *b* is placed on suitable bearings on which a platform *c* is mounted which receives the clover-heads or bolls after they are stripped by the teeth from the plants. To prevent the heads from rolling off the platform it is provided with two raised sides *c' c'* and an end board *c²* across its hinder end, its front end being open to receive the bolls from the teeth *e*.

To the rear end of the frame *a* a bent lever *f* is pivoted, its long arm extending upward a convenient height for the attendant of the machine to lay hold of it, and its short arm being connected with the hinder end of the platform in such a manner as to elevate and depress it when the long arm is turned backward and forward; in this manner the front end of the platform, on which the stock *m* of the fingers rests, can be raised and lowered so as to adapt the height of the fingers to the growth of the clover plants whose bolls are required to be stripped off. When the growth of a field of clover is of uniform height, and either short or tall, the fingers may be fixed at the proper height for stripping it, by a ratchet or catch, pin, hasp, or otherwise. Instead of raising and lowering the front of the platform to elevate and depress the fingers, the platform may be made stationary on the frame, and the fingers elevated and depressed by attaching their stock to adjustable vibrating levers turning on the side of the platform or frame, and in this case it would be necessary to place the stock with its fingers some distance in advance of the platform, and connect it therewith by a hinged apron or trap-door, which would serve to convey the clover heads from the teeth to the platform, and at the same time facilitate the unloading of the latter by being raised up to allow the heads to drop through to the floor of the garner.

To the projecting front-ends of the platform *a* the stock *m* which carries the fingers *e* is hinged, and therefore is raised or depressed with the platform. From the front side of the stock *m* the teeth *e* project forward, and from its rear side the arms *n* project backward, the whole being rigidly connected together. The rear ends of the arms *n* have slots made in them through which pins *o* Fig. 1, project from the rear ends of the sides of the frame to support them. When the teeth are raised or lowered they vibrate in an arc, whose center being the pins *o*, is so distant, that their angle with the ground is not altered enough within the limits of their range of motion to affect appreciably their operation. The parallelism of the teeth with the ground could be maintained by causing the stock *m* to slide up and down in vertical guides *r* as seen in Fig. 8, or by connecting a short arm *m'* projecting upward from the stock *m* as in Fig. 7 by a long ling *n'* to the frame *a*, and by various other devices, each of which would obviously be merely the mechanical equivalent of the other, and of the device which I have described by way of exemplification of this part of my invention.

The teeth *e* I prefer to make of cast iron but they may be made of any material the constructor thinks proper to use. They are of the form represented in the various figures, having a bracket *s* Figs. 4 and 6 projecting down from the under side of their hinder end which rests against the stock and affords them a firm support. These teeth have an oblong hole *t* made transversely through their rear ends to receive a steel blade or sword *v* which is thrust through the whole of them after they are secured to the stock. This blade may be made in sections and attached to, or combined with the teeth, in any other manner that may be preferred, as for instance it might be let into the upper or under sides of the teeth or might pass through them in other positions, or it might be secured to a separate bracket *s* attached to the stock below the teeth as in Fig. 5. Each tooth has a hole made through its rear end through which a screw *w* passes into the stock *m* to fasten it thereto. The fingers are placed at such a distance apart on the stock, that the space between them will admit the stalk of a clover plant but will not allow the head or boll containing the seed to be pulled down through it, so that when these teeth are moved through a crop of clover plants in the manner of a comb, they will strip off all the heads and collect them on the platform but leave the stalks on the ground. To prevent the plants from being pulled up by the roots the knife *v* which passes transversely through the teeth is placed with its edge toward the plants, and in advance of the stock so that when the stalks are pulled against it they may be cut off; in order that the blade may the better perform its office it should be kept sharp. To aid the blade in cutting off the stalks, the fingers *e* may be made with depressions (*y* Fig. 4) just before the stock *m* and immediately above the knife *v* which will have the effect of releasing the head to allow the stalk to be drawn downward obliquely across the edge of the blade at the moment of cutting.

What I claim in the foregoing as my invention and desire to secure by Letters Patent is—

1. Maintaining the series of teeth at nearly the same angle with the ground at all heights to which they may be adjusted therefrom in the manner herein set forth, and represented in Fig. 1.

2. I also claim forming the fingers with a depression on their upper side above the knife, substantially in the manner and for the purpose herein set forth.

SAML. KRAUSER.

Witnesses:
 DAVID MEDARY,
 JOHN HILLA.